(12) United States Patent
Adams et al.

(10) Patent No.: US 9,730,112 B2
(45) Date of Patent: Aug. 8, 2017

(54) IDENTITY BASED ACCESS AND PERFORMANCE ALLOCATION

(71) Applicant: Northrop Grumman Systems Corporation, Falls Church, VA (US)

(72) Inventors: Mark S. Adams, Ashburn, VA (US); Ajay Gupta, Oakton, VA (US); Susan L. Connell, Fairfax, VA (US); Yama A. Noori, Ashburn, VA (US); Rajesh K. Benjamin, Lisle, IL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 14/674,637

(22) Filed: Mar. 31, 2015

(65) Prior Publication Data

US 2016/0295543 A1    Oct. 6, 2016

(51) Int. Cl.
*H04M 3/16* (2006.01)
*H04W 28/24* (2009.01)
*H04W 8/18* (2009.01)
*H04W 48/02* (2009.01)
*H04W 8/04* (2009.01)

(52) U.S. Cl.
CPC ......... *H04W 28/24* (2013.01); *H04W 8/183* (2013.01); *H04W 48/02* (2013.01); *H04W 8/04* (2013.01)

(58) Field of Classification Search
CPC ..... H04W 12/06; H04W 12/08; H04W 12/00; H04W 4/001; H04W 4/003; H04W 4/043; H04W 80/04; H04W 84/045

USPC ......... 455/410, 411, 412, 418, 432.3, 426.1, 455/426.2, 433, 434, 435.1
See application file for complete search history.

(56) References Cited

U.S. PATENT DOCUMENTS

| | | | |
|---|---|---|---|
| 8,131,745 B1 * | 3/2012 | Hoffman | G06Q 10/107 707/766 |
| 8,776,225 B2 * | 7/2014 | Pierson | H04L 63/08 726/23 |
| 2003/0004746 A1 * | 1/2003 | Kheirolomoom | G06Q 10/10 717/104 |
| 2003/0008662 A1 * | 1/2003 | Stern | H04M 1/72572 455/456.1 |
| 2003/0035409 A1 * | 2/2003 | Wang | H04L 29/06 370/349 |
| 2004/0116138 A1 * | 6/2004 | Greenspan | H04W 76/028 455/501 |
| 2005/0049934 A1 * | 3/2005 | Nakayama | G06Q 99/00 705/500 |
| 2005/0089048 A1 * | 4/2005 | Chittenden | H04L 12/24 370/395.54 |
| 2005/0177731 A1 * | 8/2005 | Torres | H04L 67/02 713/182 |
| 2010/0100925 A1 * | 4/2010 | Hinton | G06F 21/10 726/1 |

(Continued)

*Primary Examiner* — Jean Gelin
(74) *Attorney, Agent, or Firm* — McNair Law Firm, P.A.

(57) ABSTRACT

A method for dynamically provisioning access and/or service for a device may include receiving information indicative of a user identity associated with a user of a device, correlating the user identity to the device, determining a user profile descriptive of access to be afforded to the user in a network or indicative of service parameters associated with provision of services to the user in the network, and granting the user access to use the network services via the device in accordance with the user profile.

16 Claims, 6 Drawing Sheets

(56) References Cited

U.S. PATENT DOCUMENTS

| | | | | |
|---|---|---|---|---|
| 2010/0268783 A1* | 10/2010 | Mizosoe | .............. | G06Q 10/107 |
| | | | | 709/206 |
| 2012/0069131 A1* | 3/2012 | Abelow | ............... | G06Q 10/067 |
| | | | | 348/14.01 |
| 2012/0135712 A1* | 5/2012 | Bari | ....................... | G06Q 30/04 |
| | | | | 455/411 |
| 2012/0195417 A1* | 8/2012 | Hua | .................. | H04M 3/42042 |
| | | | | 379/142.04 |
| 2014/0086177 A1* | 3/2014 | Adjakple | .............. | H04W 12/08 |
| | | | | 370/329 |
| 2015/0215832 A1* | 7/2015 | Fitzpatrick | ............ | H04W 48/18 |
| | | | | 455/426.1 |
| 2015/0312696 A1* | 10/2015 | Ribbich | ................ | H04W 4/043 |
| | | | | 455/418 |
| 2016/0048880 A1* | 2/2016 | Linden | ................ | G06Q 30/0241 |
| | | | | 705/14.66 |
| 2016/0057565 A1* | 2/2016 | Gold | .................... | H04W 4/008 |
| | | | | 455/41.1 |

\* cited by examiner

| Unique ID | Credentials |
|---|---|
| User$_1$ | Password$_1$ |
| User$_2$ | Password$_2$ |
| * | * |
| * | * |
| * | * |
| User$_n$ | Password$_n$ |

FIG. 2

| Unique ID | User QoS Profile |
|---|---|
| User$_1$ | User$_1$ profile |
| User$_2$ | User$_2$ profile |
| * | * |
| * | * |
| * | * |
| User$_n$ | User$_n$ profile |

FIG. 3

| Unique ID | IMSI |
|---|---|
| User$_1$ | IMSI$_1$ |
| User$_2$ | IMSI$_2$ |
| * | * |
| * | * |
| * | * |
| User$_n$ | IMSI$_n$ |

FIG. 4

| IMSI | User QoS Profile |
|---|---|
| IMSI$_1$ | User$_1$ profile |
| IMSI$_2$ | User$_2$ profile |
| * | * |
| * | * |
| * | * |
| IMSI$_n$ | User$_n$ profile |

FIG. 5

IDENTITY BASED ACCESS AND PERFORMANCE ALLOCATION

TECHNICAL FIELD

Example embodiments generally relate to wireless communication technology and, more particularly, relate to performance allocation and provision of access and quality of service within a network on the basis of identity and other user attributes of the individual.

BACKGROUND

Network communication technologies continue to evolve in order to facilitate ease of information transfer and convenience to users. In order to provide easier or faster information transfer and convenience, telecommunication industry service providers are developing improvements to existing networks. These improvements are often aimed at upgrading prior technologies by improving efficiency, lowering costs, improving services, making use of new spectrum opportunities, and providing better integration with other open standards. However, even as these technologies improve, a paradigm of matching a single user to a single device still generally persists.

Today, a single device is typically matched to a corresponding single user profile. However, in certain environments (such as public safety and/or government networks), there may be a need or desire for multiple users to use a single device or single user with multiple devices (e.g., an officer with a body worn camera, voice device, and a pad device for data applications). When multiple users use the same device or when a single user having multiple devices needs priority access on a given one of those devices, there is currently no way to allow different levels of access and/or different performance allocation to be provided to the device on the basis of which individual user has the device. Thus, there may be a need to improve network communication technology in relation to this feature.

BRIEF SUMMARY OF SOME EXAMPLES

Some example embodiments may therefore provide an identity management function that is configured to provide a more dynamic process for the allocation of performance parameters to devices and/or the provision of access to information. Thus, for example, multiple users could employ the same device and, dependent upon which user is signed in, corresponding different access and performance allocations may be employed. Alternatively or additionally, a single user may have multiple devices for which they may require priority access in certain situations. For example, safety and security personnel or first responders (e.g., police/fire chief, captain, etc.) may need priority access when certain situations occur.

In accordance with an example embodiment, a method for dynamically provisioning access and/or service for a device is provided. This may include receiving information indicative of a user identity associated with a user of a device, correlating the user identity to the device, determining a user profile descriptive of access to be afforded to the user in a network or indicative of service parameters associated with provision of services to the user in the network, and granting the user access to use the network services via the device in accordance with the contents of user profile.

In accordance with another example embodiment, an apparatus of a communication network for dynamically provisioning access and/or service for a wireless communication device is provided. The apparatus may include processing circuitry configured for receiving information indicative of a user identity associated with a user of the device, correlating the user identity to the device, determining a user profile descriptive of access to be afforded to the user in the network or indicative of service parameters associated with provision of services to the user in the network, and granting the user access to use the network services via the device in accordance with the user profile.

In accordance with still another example embodiment, a communication network is provided. The network may include a wireless communication device, one or more access nodes configured to wirelessly connect to the wireless communication device to provide network services to the wireless communication device, a Home Subscriber Server/Subscriber Profile Registry datastore configured to store service subscription states and user-subscribed QoS information to be provided to devices of the network, and an Identity and Access Management module for dynamically provisioning access and/or service for the wireless communication device. The Identity and Access Management module may include processing circuitry configured for receiving information indicative of a user identity associated with a user of the wireless communication device, correlating the user identity to a device identifier of the wireless communication device, determining a user profile descriptive of access to be afforded to the user in the network or indicative of service parameters associated with provision of services to the user in the network, and updating the Home Subscriber Server/Subscriber Profile Registry datastore of the network to associate the user profile with the device identifier to grant the user access to use the network services via the wireless communication device in accordance with the user profile.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 2 illustrates a table for matching a plurality of user IDs to corresponding credentials, which may be respective passwords associated with each user according to an example embodiment;

FIG. 3 illustrates a table for matching the unique user IDs to corresponding user QoS profiles in accordance with an example embodiment;

FIG. 4 illustrates a table for matching unique user IDs to respective device identifiers in accordance with an example embodiment;

FIG. 5 illustrates a table for matching device identifiers to user QoS profiles in accordance with an example embodiment;

DETAILED DESCRIPTION

Figure 1:
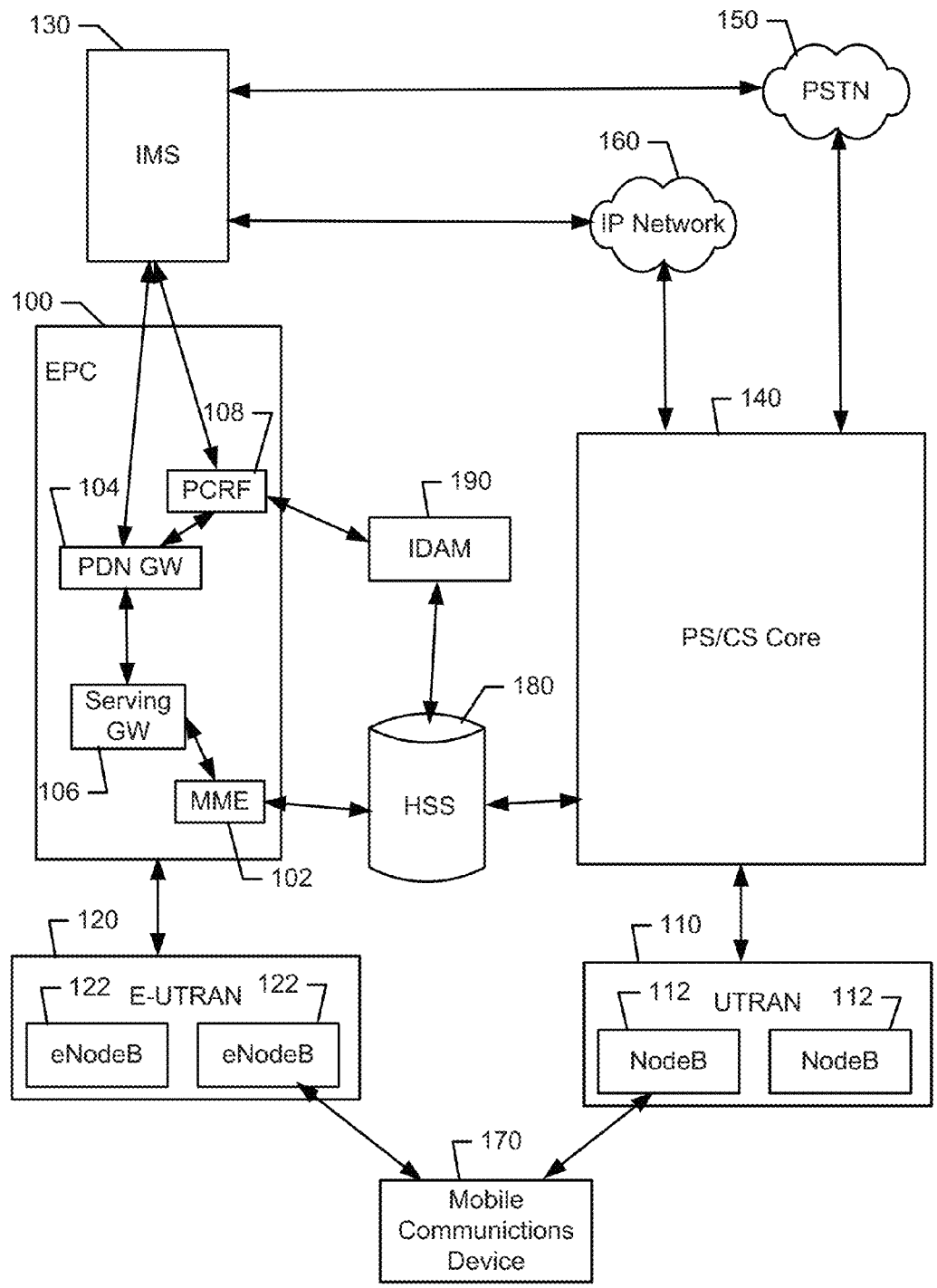
FIG. 1 illustrates a schematic block diagram of a wireless communications system according to an exemplary embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

An important security requirement for an enterprise network is the ability to authenticate the end user to ensure that the end user has the valid credentials to be allowed access into the network space. In addition, end user's credentials must also determine the QoS performance metrics and access privileges afforded to the user upon access. The LTE standard, in its present form, falls short of meeting these requirements.

The LTE standard does provide a mechanism to authenticate the user through a Universal Subscriber Identity Module (USIM) that resides inside of the end user device. This, however, implies that the network is only authenticating the device (USIM) and not the end-user of the device. This works as a business practice for the commercial wireless carriers who sell subscription services to their networks to individuals or entities and do not need to know the identities of the actual users of the devices. However, this practice does not fit the operating security models for many enterprise networks.

Public safety has a real use case where multiple users may share the same device and the network has a need to know the user's identity to provide them with services based on their individual roles and access privileges. An illustrative example is a mobile data terminal inside of a police vehicle shared by multiple law enforcement officers, potentially of different ranks and with corresponding different privileges, at different times during a 24 hour cycle. LTE standards presently provide no mechanism to authenticate and distinguish between multiple users of the same device. As far as the network is considered, once the device is authenticated, anyone can use the device, and all users of the device are treated the same way by the network with respect to the QoS and access privileges.

Accordingly, an example embodiment is provided to enable authentication of the user in addition to authenticating the device, and assigning a Quality of Service (QoS) profile based on the user identity and not just the based on the device (USIM) identity which is typically synonymous with the International Mobile Subscriber Identity (IMSI).

An example embodiment therefore provides an Identity and Access Management (IDAM) module to authenticate the end user of the device. The IDAM may be integrated with LTE's Evolved Packet Core (EPC) to provide a methodology for dynamically updating the QoS profiles in the Home Subscriber Server/Subscriber Profile Registry (HSS/SPR) datastore based on the identity of the user actually using the device.

FIG. 1 illustrates a schematic block diagram of a wireless communications system according to an exemplary embodiment. The system generally shows an LTE network infrastructure, which may benefit from an example embodiment. The network may include an EPC 100, a Universal Mobile Telephone System (UMTS) terrestrial access network (UTRAN) 110, evolved UTRAN (E-UTRAN) 120, an IP multimedia system (IMS) 130, and packet switched (PS) and circuit switched (CS) core networks (PS/CS core) 140. The IMS 130 and PS/CS core 140 may interface with a packet switched telephone network (PSTN) 150 and an IP network 160. In an example embodiment, the UTRAN 110 may include a plurality of NodeBs 112, and the E-UTRAN 110 may include a plurality of eNodeBs 122 that are each configured to wirelessly communicate with a mobile communication device 170. The NodeBs 112 and eNodeBs 122 may each be examples of communication nodes that are configured to provide network services to the device 170.

The EPC 100 may include an MME 102 that may be configured to handle control plane functions related to subscriber and session management. As such, the MME 102 may support security procedures relating to end-user authentication and initiation and negotiation of ciphering and integrity protection algorithms. The MME 102 may also provide session handling relating to all signaling procedures used to set up packet data context and negotiate parameters such as QoS. In some cases, the MME 102 may also provide idle terminal location management for tracking area update processes used to join terminals in case of incoming sessions.

The EPC 100 may also include a packet data network gateway (PDN GW) 104, a serving gateway 106 and a policy and charging rules function (PCRF) server 108. The serving gateway 106 may be configured to act as a termination point of the packet data interface toward E-UTRAN 120. Thus, for example, the serving gateway 106 may serve as a local mobility anchor through which packets are routed for intra E-UTRAN mobility and mobility with other technologies. The PDN GW 104 may be configured to serve as a termination point of the packet data interface towards the packet data network. As such, the PDN GW 104 may serve as an anchor point for sessions towards the packet data networks and may support policy enforcement features and packet filtering. The PCRF 108 may be configured to manage the service policy and send QoS setting information for each user session and accounting rule information. The PCRF 108 may combine functionalities for making policy decisions (e.g., allowing or rejecting media requests, using new or existing context information for incoming media requests, allocating resources against authorized limits, etc.) and for providing operator-defined charging rules applicable to each service data flow.

The HSS/SPR 180 may include or function as a home location register and an authentication center. As such, the HSS/SPR 180 may be employed to store and update databases including user subscription information. Thus, for example, user identification and addressing information corresponding to the IMSI and mobile subscriber ISDN number (MSISDN) and user profile information corresponding to service subscription states and user-subscribed QoS information (e.g., maximum bit rate, allowed traffic classes, etc.) may be updated, stored or otherwise managed by the HSS/SPR 180. The HSS/SPR 180 may also be configured to generate security information from user identify keys. The security information may be provided to entities in the network for mutual network-terminal authentication and radio path ciphering and integrity protection.

In an example embodiment, the IDAM 190 may be provided in communication with the HSS/SPR 180 and the PCRF 108 to implement an example embodiment. In some cases, the IDAM 190 may be an entity that provides an API interface for interfacing with the PCRF 108 and the HSS/SPR 180 to allow dynamic updating of user and device associations based on unique identifiers provided to or associated with each respective user. In this regard, for example, since LTE does not currently have any mechanism to associate multiple user profiles with the same user device (USIM) or IMSI, there can only be one user profile per device, stored in the HSS/SPR 180. However, the IDAM 190 may be configured to enable dynamically updating the user profile in the HSS/SPR 180 based on the identity of the user using the device 170. In this regard, the IDAM 190 may be configured to provide dynamic subscriber management and user profile updating so that, for example, subscriber and QoS profiles can be created, modified and/or deleted. Since the user identity needs to be validated by the IDAM 190 before the user profile can be updated in the HSS/SPR 180, an association is required between the user information maintained by the IDAM 190 and the user profile maintained in the HSS/SPR 180. This association can be built by using tables. In this regard, for example, FIG. 2 illustrates a table 200 for matching a plurality of user IDs 210 to corresponding credentials 220, which may be respective passwords associated with each user. The table 200 of FIG. 2 may be populated as part of the user provisioning process and is maintained by the IDAM 190. During the user authentication phase, the IDAM 190 may be configured to check the credentials supplied by the user in the log-in page against the credentials stored in the <Unique-ID, Credentials> table (i.e., table 200). Note that each user is assigned a unique ID. The table 200 is a semi-static table that is updated periodically when users are added, or when profiles are modified or deleted from the network.

FIG. 3 illustrates a table 300 for matching unique user IDs 210 to corresponding user QoS profiles 320. The <Unique-ID, User QoS profile> table (i.e., table 300) is also populated as part of the user provisioning process and may be maintained either by the IDAM 190 or some other network process. The user profile determines a user's QoS in terms of network resources such as bandwidth, prioritization of traffic and priority access to the network during times of congestion. The user profile may also store information about the access privileges of the user for various agencies and network-hosted applications. The user profile may also support the notion of tiered QoS, where the user receives one QoS on the home network, but a different QoS when visiting outside of the home network. Table 300 is also a semi-static table that is updated periodically when users are added or deleted from the network or when user profiles are modified.

Figure 6:
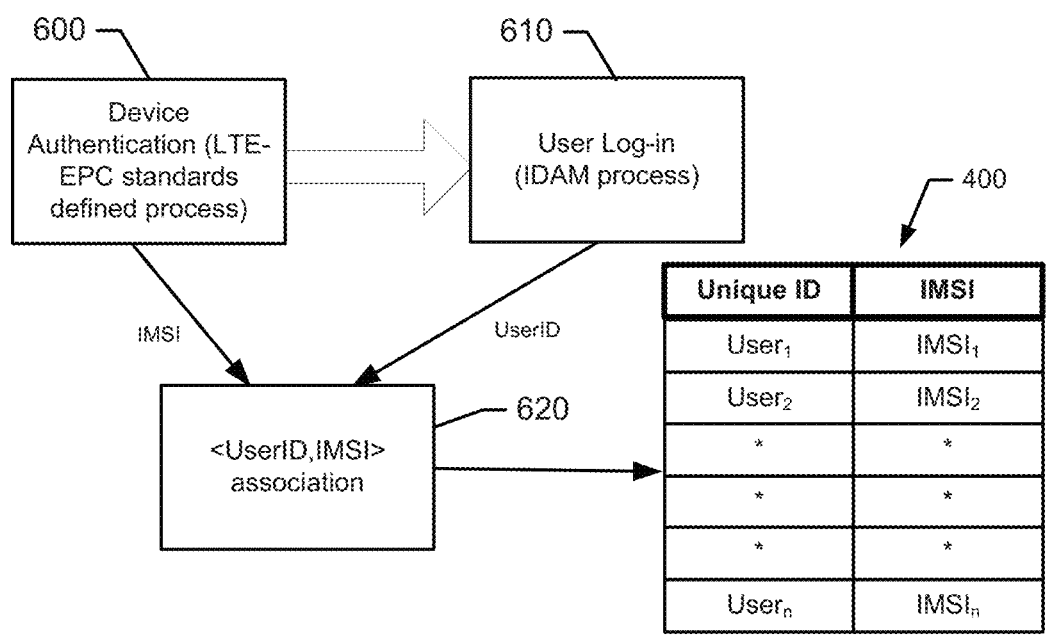
FIG. 6 illustrates a block diagram showing the association and relationship to the table of FIG. 4 in accordance with an example embodiment.

FIG. 4 illustrates a table 400 for matching unique user IDs 210 to respective IMSIs 420. The <Unique-ID, IMSI> table (i.e., table 400) provides the association between the user using the device at any given time and the unique device (USIM) identifier which is typically the IMSI. The unique-IDs in the table can be pre-populated based on the provisioning information. However, the IMSI value may be assigned to a unique-ID only after both the device authentication and the user log-in processes have been successfully completed. Note that at any given time each IMSI is associated with only one user. However, the same IMSI may be associated with different users at different times. This dynamic association between the user-ID and the IMSI can be performed by a network process that is triggered after the device authentication by the network and user log-in process by the IDAM 190 have been successfully completed. Logically, the device authentication and the log-in for the user of the device must be treated as a single process to create a one-to-one dynamic association between the IMSI and the unique-ID. FIG. 6 illustrates a block diagram showing the association and relationship to the table 400. As shown in FIG. 6, the device authentication process 600 may occur in which the IMSI is provided for association. The user may then login as part of an IDAM process 610 to generate a user-ID. The user-ID and IMSI can then be associated at operation 620 for the association shown in table 400.

Figure 7:
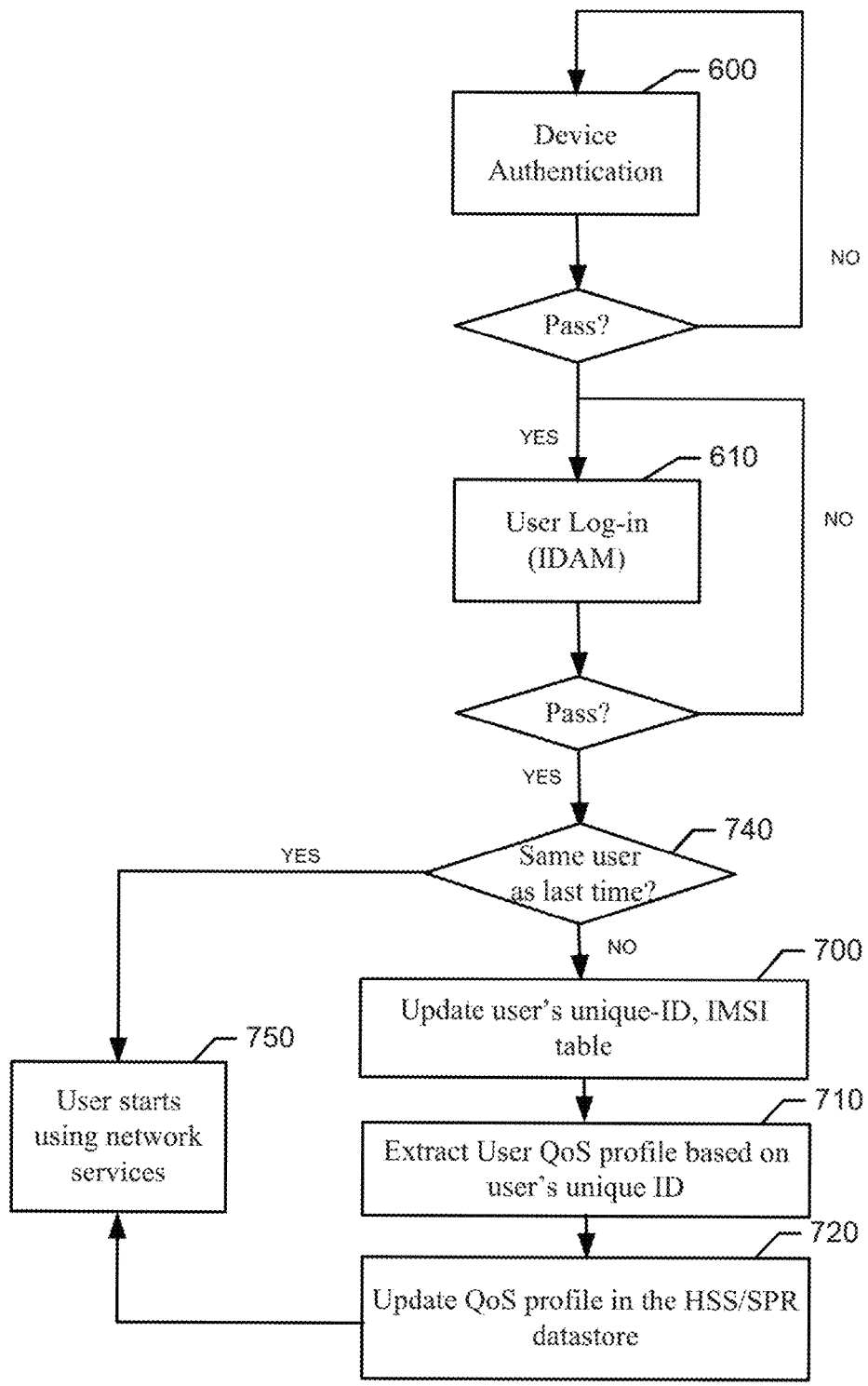
FIG. 7 illustrates a block diagram of a method for dynamic HSS/SPR updating in accordance with an example embodiment.

FIG. 5 illustrates a table 500 for matching IMSIs 420 to user QoS profiles 320. The <IMSI, User QoS profile> table (i.e., table 500) may be stored in the HSS/SPR 180 and may be indexed based on the unique IMSI assigned to each device (USIM). Since different users could be associated with the same device and therefore the same IMSI, this table is dynamically updated by a network process with the QoS profile of the user that is currently using the device. The process for the dynamic HSS/SPR 180 update is illustrated in FIG. 7.

The <Unique-ID, IMSI> table (i.e., table 400) may be updated following the successful completion of the device authentication and the user log-in process as shown in operation 700. The user QoS profile is then pulled from the <Unique-ID, User QoS profile> table based on the unique-id of the user as shown in operation 710. Since the IMSI associated with the user's unique-ID has already been determined in operation 700, the HSS/SPR 180 may be updated with the user QoS profile as shown in operation 720. In some cases, the same user may be subsequently logging into the network using the same device. In that situation, there is no need to update the user QoS profile in the HSS/SPR 180 as it is already stored in the HSS/SPR 180 against the correct IMSI. Accordingly, as shown in FIG. 7, following device authentication at operation 600 and user login at operation 610, a check may be performed to determine if the user logging in with the device is the same user that logged in with the same device as last time at operation 740. If the answer is yes, then the user can start using the network services at operation 750 without performing operations 710 and 720 as shown in FIG. 7.

Example embodiments may be useful to dynamic updating of user profiles in the HSS/SPR 180 responsive to the occurrence of a potential identity change event. The potential identity change event may generally be an event that can be associated with a user or user identity change such as the passing of the device 170 from one user to another user. In an example embodiment, the potential identity changing event may be experienced when turning the device on, when a user logs off and a next user logs on, and/or when an event occurs that requires a change in profile for a user or a group of users. Responsive to the potential identity change event, information indicative of the user's identity may initially be received and then dynamically correlated to the device 170 (e.g., via correlating the user identity to the IMSI of the device 170). A user profile descriptive of access to be afforded to the user in the network or indicative of service parameters associated with provision of services to the user (e.g., QoS parameters) that is associated with the user may then be determined. Finally, the device 170 (e.g., via the IMSI of the device 170) may be dynamically associated with the user profile before the user is granted access to use the network services in accordance with the user profile.

Figure 8:
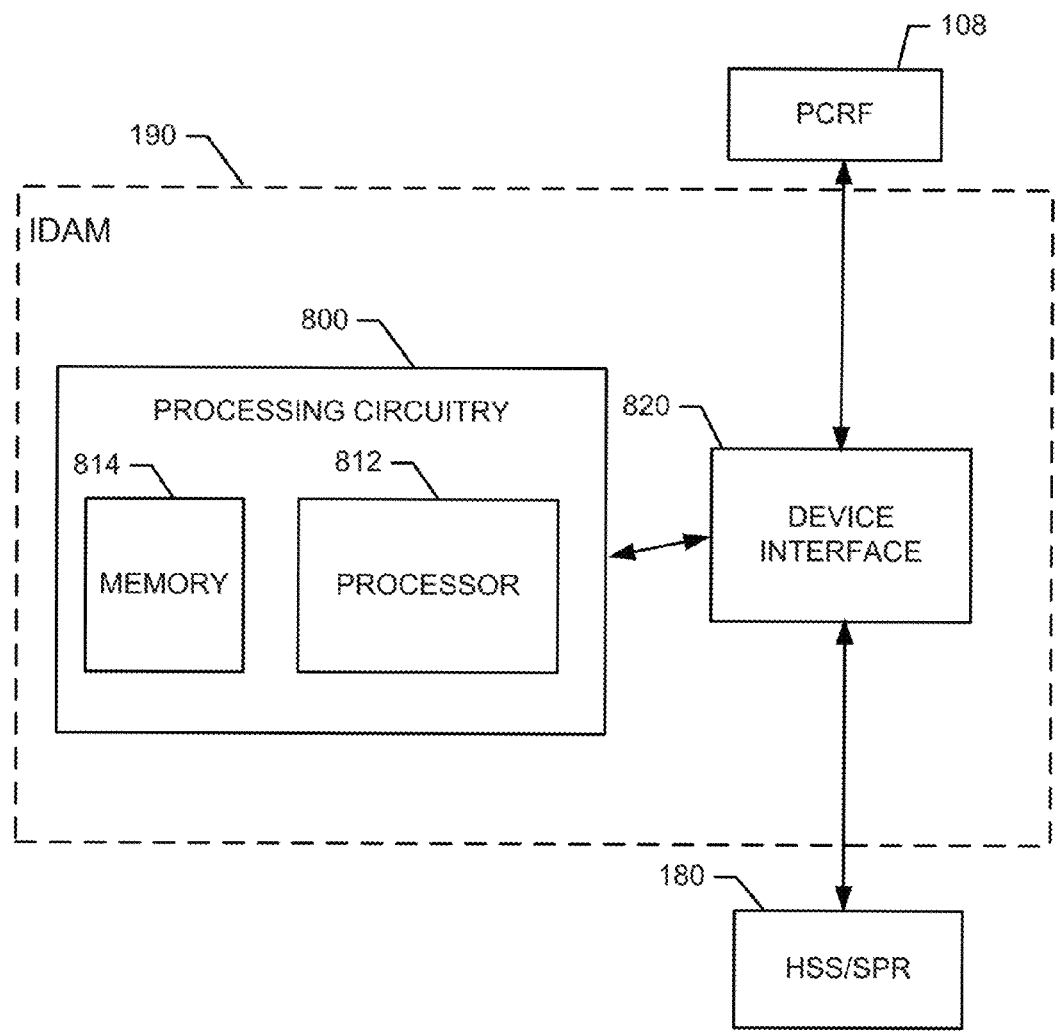
FIG. 8 illustrates a block diagram of an apparatus configured to perform an identity management function according to an example embodiment.

In an example embodiment, the IDAM 190 may include processing circuitry configured to interface with the HSS/SPR 180 and the PCRF 108 to accomplish the activities described above in reference to FIGS. 2-7. FIG. 8 illustrates a block diagram of various components of the processing circuitry 800 to illustrate some of the components that may enable or enhance the functional performance of the IDAM 190 and to facilitate description of an example embodiment. In some example embodiments, the processing circuitry 800 may be configured to perform data processing or control function execution and/or other processing and management services according to an example embodiment of the present invention. In some embodiments, the processing circuitry 800 may be embodied as a chip or chip set. In other words, the processing circuitry 800 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 800 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 800 may include one or more instances of a processor 812 and memory 814 that may be in communication with or otherwise control a device interface 820. As such, the processing circuitry 800 may be embodied as a circuit chip (e.g., an integrated circuit chip) configured (e.g., with hardware, software or a combination of hardware and software) to perform operations described herein. However, in some embodiments, the processing circuitry 800 may be embodied as a portion of a computer or server.

The processor 812 may be embodied in a number of different ways. For example, the processor 812 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 812 may be configured to execute instructions stored in the memory 814 or otherwise accessible to the processor 812. As such, whether configured by hardware or by a combination of hardware and software, the processor 812 may represent an entity (e.g., physically embodied in circuitry—in the form of processing circuitry 800) capable of performing operations according to embodiments of the present invention while configured accordingly. Thus, for example, when the processor 812 is embodied as an ASIC, FPGA or the like, the processor 812 may be specifically configured hardware for conducting the operations described herein. Alternatively, as another example, when the processor 812 is embodied as an executor of software instructions, the instructions may specifically configure the processor 812 to perform the operations described herein.

In an example embodiment, the processor 812 (or the processing circuitry 800) may be embodied as, include or otherwise control the IDAM 190. As such, in some embodiments, the processor 812 (or the processing circuitry 800) may be said to cause each of the operations described in connection with the IDAM 190 by directing the IDAM 190 to undertake the corresponding functionalities responsive to execution of instructions or algorithms configuring the processor 812 (or processing circuitry 800) accordingly. These instructions or algorithms may configure the processing circuitry 800, and thereby also the IDAM 190, into a tool for dynamically associating physical things (e.g., communication devices) with different identities and then provisioning service or access for those physical things based on the corresponding identities (and particularly based on communication/access parameters associated with the identities) with which they have been dynamically associated in accordance with the instructions provided.

In an exemplary embodiment, the memory 814 may include one or more non-transitory memory devices such as, for example, volatile and/or non-volatile memory that may be either fixed or removable. The memory 814 may be configured to store information, data, applications, instructions or the like for enabling the IDAM 190 to carry out various functions in accordance with exemplary embodiments of the present invention. For example, the memory 814 could be configured to buffer input data for processing by the processor 812. Additionally or alternatively, the memory 814 could be configured to store instructions for execution by the processor 812. As yet another alternative, the memory 814 may include one or more databases that may store a variety of data sets responsive to input from other components or entities of the network. Among the contents of the memory 814, applications may be stored for execution by the processor 812 in order to carry out the functionality associated with each respective application. The applications or other such configuration of the processor 812 (and therefore the processing circuitry 800 and by extension the IDAM 190) may include applications for configuring the IDAM 190 relative to various operations including dynamically associating user identity with a communication device and then provisioning access and/or services for the device on the basis of the user identity as described herein.

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to the PCRF 108 and/or the HSS/SPR 180. In some example embodiments, the device interface 120 may provide interfaces for communication of data to/from the PCRF 108 and/or the HSS/SPR 180 for dynamically associated devices with specific user identities and their corresponding access/communication parameters.

As may be appreciated from the descriptions herein, some example embodiments may be practiced using an apparatus such as the one described in reference to FIGS. 1 and 8. Moreover, the apparatus may carry out functions indicated in block diagrams of FIGS. 7 and 9. However, it should also be appreciated that some embodiments (or aspects thereof) may be practiced in connection with a computer program product for performing example embodiments of the present invention. As such, for example, each block or step of the flowchart of FIG. 9, and combinations of blocks in the flowcharts, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 814) and executed by processing circuitry 800 (e.g., via processor 812).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Figure 9:
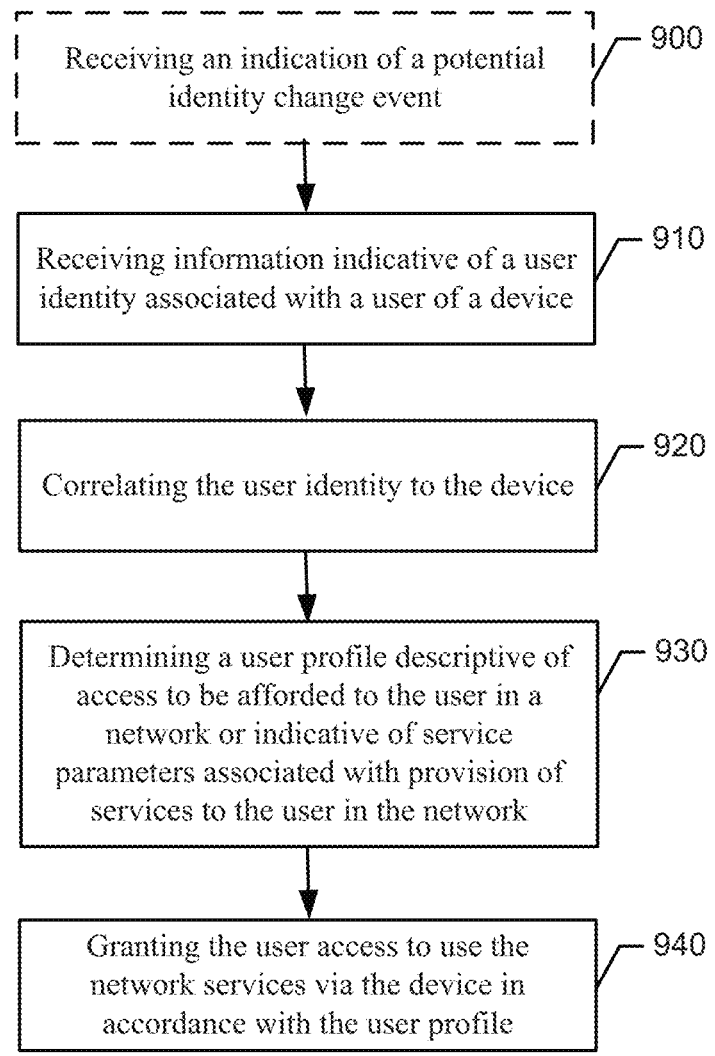
FIG. 9 illustrates a block diagram of one example of a method of dynamically provisioning access and/or service for a device in accordance with an example embodiment.

FIG. 9 illustrates a block diagram of one example of how dynamic identity based access provision and/or QoS service profile provision may be accomplished in accordance with an example embodiment. As shown in FIG. 9, a method for dynamically provisioning access and/or service for a device based on the identity of the user of the device may include receiving an indication of a potential identity change event at operation 900. The potential identity change event may include turning the device on, new user log-in, and/or the occurrence of an event that requires a change in profile for a user or a group of users. Responsive to the potential identity change event, information indicative of the user's identity may initially be received at operation 910. At operation 920, the user's identity may be dynamically correlated to the device (e.g., via correlating the user identity to the IMSI of the device). A user profile that is associated with the user may then be determined at operation 930. The user profile may be descriptive of access to be afforded to the user in the network or indicative of service parameters associated with provision of services to the user (e.g., QoS parameters). At operation 940, the device may be dynamically associated with the user profile to grant the user access to use the network services in accordance with the user profile. Of note, the basic method of an example embodiment may include operations 910 to 940, and operation 900 may be an optional trigger event. The method of operations 910 to 940 may enable any device to tie priority to the user's identity when the user logs in with appropriate credentials. The additional operation 900 highlights the fact that the same device can therefore be employed to provide access to services and QoS parameters associated with different user profiles by repeating the method for a given profile after a user identity change event has occurred. Thus, for example, granting the user access to use the network services at operation 640 may include granting access to a first user, and, responsive to a login on the same device by a second user, access may be granted to the second user based on a second user profile associated with the second user.

In some cases, the operations 900-940 may also be modified, augmented or amplified in some cases. For example, in some embodiments, the method may further include an initial operation of receiving an indication of a potential identity change event. In such an example, receiving the information indicative of the user identity may occur responsive to the potential identity change event. In some cases, the potential identity change event may include turning the device on, log-in of a new user, or occurrence of an event requiring a change in profile for a user or a group of users. In an example embodiment, correlating the user identity to the device may include correlating the user identity to a device identifier of the device. In some such examples, the device identifier may be an IMSI of the device. In an example embodiment, the user profile may be indicative of quality of service parameters to be provisioned to the device. In some embodiments, determining the user profile may include determining the user profile based on a table associating a unique identifier indicative of the user identity with a user quality of service profile. In an example embodiment, granting the user access to use the network services may include granting the user access responsive to updating a HSS/SPR datastore of the network to associate the user profile with the device identifier.

In an example embodiment, an apparatus for performing the method of FIG. 9 above may comprise a processor (e.g., the processor 812) configured to perform some or each of the operations (900-940) described above. The processor 812 may, for example, be configured to perform the operations (900-940) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 900-940 may comprise, for example, the processing circuitry 800.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for dynamically provisioning access and/or service for a device, the method comprising:
   receiving information indicative of a unique user identity associated with a specific user;

receiving information indicative of a unique device identifier associated with the device and identifying the device as a specific device;

correlating the unique user identity to the unique device identifier, the device being used by a plurality of different users including the user at different times or the device being one of a plurality of devices used by the user at the different times;

determining a user profile descriptive of access to be afforded to the user within a wireless communication network or indicative of service parameters associated with provision of services to the user in the wireless communication network, the user profile defining quality of service parameters to be provisioned to the device; and granting the user access to use the services of the wireless communication network via the device in accordance with the quality of service parameters defined in the user profile.

2. The method of claim 1, further comprising an initial operation of receiving an indication of a potential identity change event, wherein receiving the information indicative of the unique user identity occurs responsive to the potential identity change event.

3. The method of claim 2, wherein the potential identity change event comprises log-in of a new user onto the device, or occurrence of an event requiring a change in profile for a user or a group of users on the device.

4. The method of claim 1, wherein the unique device identifier comprises an International Mobile Subscriber Identity (IMSI) of the device.

5. The method of claim 1, wherein determining the user profile comprises determining the user profile based on a table associating a unique identifier indicative of the unique user identity with a user quality of service profile.

6. The method of claim 1, wherein granting the user access to use the services of the wireless communication network comprises granting the user access responsive to updating a Home Subscriber Server/Subscriber Profile Registry datastore of the wireless communication network to associate the user profile with the unique device identifier.

7. The method of claim 1, wherein granting the user access to use the services of the wireless communication network comprises granting access to a first user, and
wherein, responsive to a login on the same device by a second user, access is granted to the second user based on a second user profile associated with the second user.

8. An apparatus of a wireless communication network for dynamically provisioning access and/or service for a wireless communication device, the apparatus comprising processing circuitry configured for:
receiving information indicative of a unique user identity associated with a specific user;
receiving information indicative of a unique device identifier associated with the device and identifying the device as a specific device;
correlating the unique user identity to the unique device identifier, the device being used by a plurality of different users including the user at different times or the device being one of a plurality of devices used by the user at the different times;
determining a user profile descriptive of access to be afforded to the user in the wireless communication network or indicative of service parameters associated with provision of services to the user in the wireless communication network, the user profile defining quality of service parameters to be provisioned to the device; and
granting the user access to use the services of the wireless communication network via the device in accordance with the quality of service parameters defined in the user profile.

9. The apparatus of claim 8, wherein the processing circuitry is further configured for an initial operation of receiving an indication of a potential identity change event, and wherein receiving the information indicative of the unique user identity occurs responsive to the potential identity change event.

10. The apparatus of claim 9, wherein the potential identity change event comprises log-in of a new user onto the device, or occurrence of an event requiring a change in profile for a user or a group of users on the device.

11. The apparatus of claim 9, wherein the unique device identifier comprises an International Mobile Subscriber Identity (IMSI) of the device.

12. The apparatus of claim 8, wherein determining the user profile comprises determining the user profile based on a table associating a unique identifier indicative of the unique user identity with a user quality of service profile.

13. The apparatus of claim 8, wherein granting the user access to use the services of the wireless communication network services comprises granting the user access responsive to updating a Home Subscriber Server/Subscriber Profile Registry datastore of the network to associate the user profile with the unique device identifier.

14. The apparatus of claim 8, wherein granting the user access to use the services of the wireless communication network comprises granting access to a first user, and
wherein, responsive to a login on the same device by a second user, access is granted to the second user based on a second user profile associated with the second user.

15. A wireless communication network comprising:
a wireless communication device;
one or more access nodes configured to wirelessly connect to the wireless communication device to provide network services to the wireless communication device;
a Home Subscriber Server/Subscriber Profile Registry datastore configured to store service subscription states and user-subscribed QoS information to be provided to devices of the wireless communication network; and
an Identity and Access Management module for dynamically provisioning access and/or service for the wireless communication device, the Identity and Access Management module comprising processing circuitry configured for:
receiving information indicative of a unique user identity associated with a specific user;
receiving information indicative of a unique device identifier associated with the wireless communication device and identifying the wireless communication device as a specific wireless communication device;
correlating the unique user identity to the unique device identifier of the wireless communication device, the wireless communication device being used by a plurality of different users including the user at different times or the wireless communication device being one of a plurality of devices used by the user at the different times;
determining a user profile descriptive of access to be afforded to the user in the wireless communication network or indicative of service parameters associated with provision of services to the user in the wireless communication network, the user profile defining quality of service parameters to be provisioned to the device; and updating the Home Subscriber Server/Subscriber Profile Registry datastore of the wireless communication network to associate the user profile with the device identifier to grant the user access to use the services of the wireless communication network via the wireless communication device in accordance with the quality of service parameters defined in the user profile.

16. The network of claim 15, wherein the Identity and Access Management module is configured to enable dynamic creation, modification and deletion of subscriber and quality of service profiles.

* * * * *